United States Patent
Carrieri et al.

[15] 3,675,976
[45] July 11, 1972

[54] GIBS

[72] Inventors: Louis F. Carrieri, La Grange Park; Edwin A. Spanke, Oak Forest, both of Ill.

[73] Assignee: U. S. Industries, Inc., New York, N.Y.

[22] Filed: Jan. 21, 1971

[21] Appl. No.: 108,358

[52] U.S. Cl. ..................................................308/3
[51] Int. Cl. ..............................................F16c 17/00
[58] Field of Search ...................................308/3, 3 A

[56] References Cited

UNITED STATES PATENTS 2,750,816   6/1956   Mott.....................................392/13.8

Primary Examiner—Martin P. Schwadron
Assistant Examiner—Frank Susko
Attorney—Johnston, Root, O'Keeffe, Keil, Thompson & Shurtleff

[57] ABSTRACT

A gib which is internally pressurized by working fluid to a predetermined pressure, and which will yield if the thrust on the gib is sufficient to exceed the internal force afforded by the working fluid.

11 Claims, 4 Drawing Figures

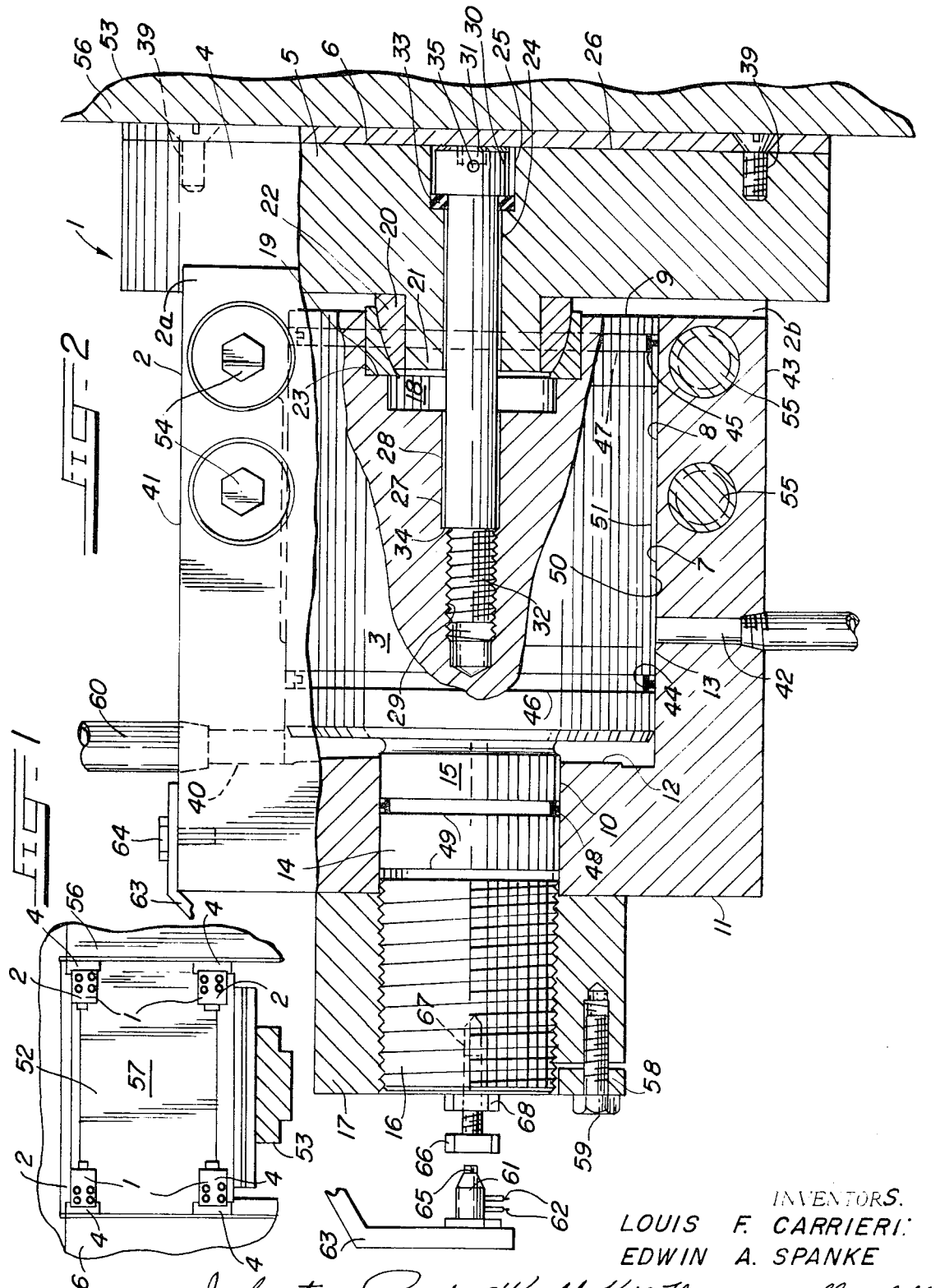

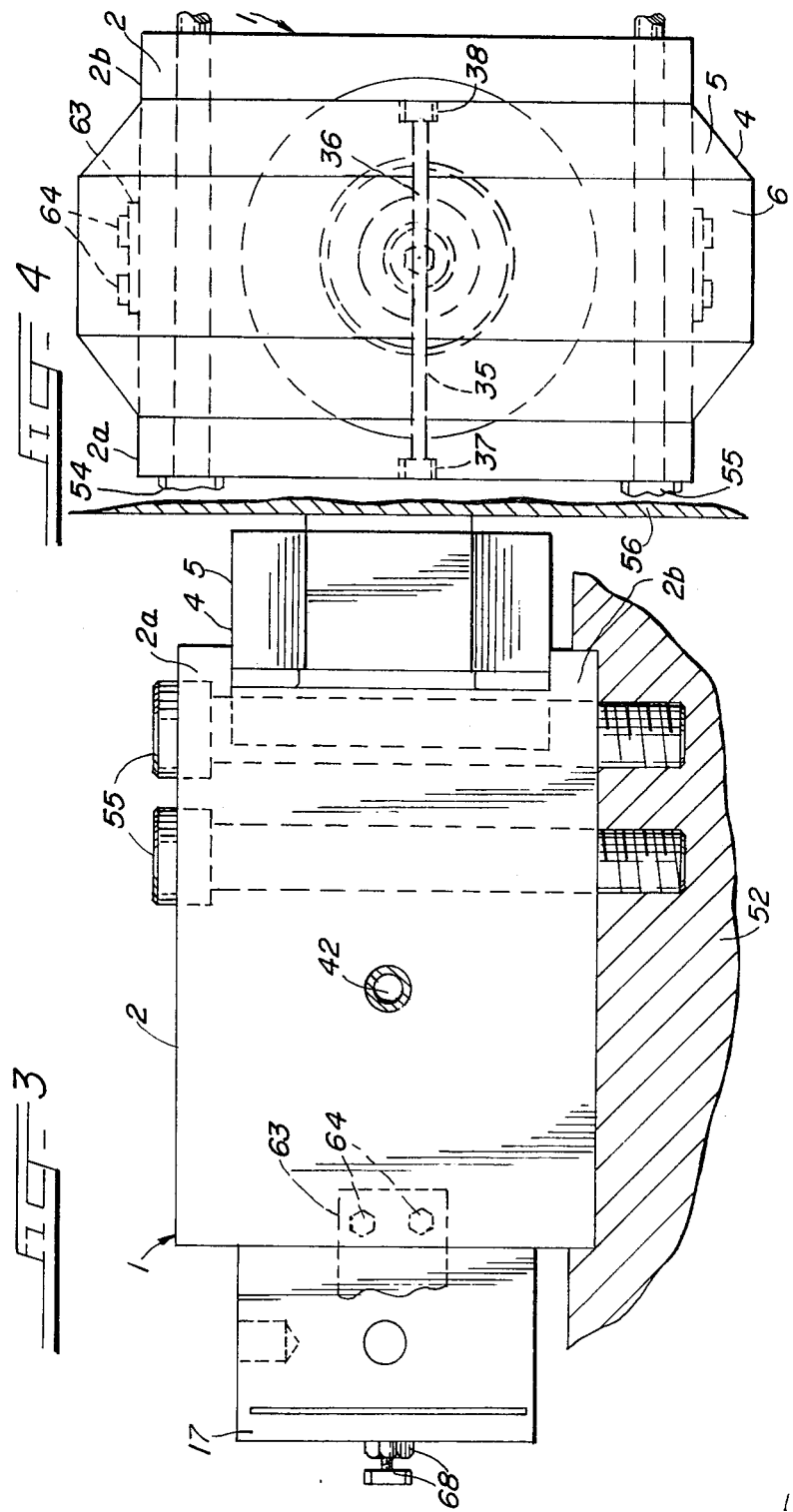

GIBS

BACKGROUND OF THE INVENTION

This invention relates to gibs, and, more particularly, to gibs which are particularly well adapted for use on compression molding machines, and the like.

It is a primary object of the present invention to afford a novel gib.

Another object of the present invention is to afford a novel gib wherein the parts thereof are movable relative to each other in a novel and expeditious manner.

A further object is to afford a novel gib which is internally pressurized to afford a yieldable construction effective to protect against excessive outward thrust being exerted thereby against supporting members in molding machines, and the like.

Gibs for use on presses, compression molding machines, and the like, for movably supporting slides therein, have been heretofore known in the art. Such gibs have been heretofore known in the art have had several inherent disadvantages, such as, for example, being rigid and unyielding in construction so as to be subject to breakage and damage when excessive forces were applied thereto; not affording protection against excess forces being applied to the supporting structure of such machines; being difficult or expensive to manufacture; of being inefficient and unreliable in operation, and the like. It is an important object of the present invention to overcome such disadvantages.

In many machines, such as, for example, presses, compression molding machines, and the like, slides, or the like, are mounted by gibs for movement along stationary supporting members, the gibs being attached to such slides and being disposed in abutting engagement with the supporting surfaces of the supporting members. In many of these machines, such as, for example, in compression molding machines, it is not uncommon to have a twisting or turning moment applied to such a slide because of an eccentric load being disposed in the machine. The frames of such machines, of course, are normally designed to accommodate or tolerate a predetermined gib force. Heretofore, when, because of eccentric loading of the machine, or the like, a gib force was created which exceeded the predetermined force, failure of the press frame commonly resulted. It is another important object of the present invention to prevent such failures from occurring.

Another object of the present invention is to afford a novel gib which will permit a slide supported thereby to tilt, without excessively straining the frame of the machine in which it is mounted, when an eccentric load is applied to the slide.

Another object of the present invention is to afford a novel gib having movable parts, and which may be preloaded in such a manner that, when a thrust greater than a predetermined force is applied through it to the supporting structure of the machine, the parts of the gib will give to thereby prevent a dangerously excessive thrust being applied against the supporting structure.

Yet another object is to afford a novel gib into which a suitable working fluid, such as, for example, hydraulic fluid, may be fed at a predetermined pressure, the fluid being effective to hold the parts of the gib in normal operative position as long as the thrust applied by the gib is not sufficient to overcome the force supplied by the hydraulic fluid, and the parts of the gib being able to move against the force of the hydraulic fluid when such thrust is exceeded.

A further object of the present invention is to afford a novel gib wherein the parts thereof are constituted and arranged relative to each other in a novel and expeditious manner effective to permit them to tilt relative to each other so as to allow a member supported by the gib to tilt relative to the supporting member for the gib without damaging or applying an excessive force to the gib or to the support therefor.

Another object is to afford a novel gib which is effective to shut down the machine in which it is embodied if the outward thrust through the gib is excessive.

A further object of the present invention is to afford a novel gib which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a somewhat diagrammatic front elevational view showing gibs, embodying the principles of the present invention, mounted on a compression molding machine;

FIG. 2 is a front view, partially in elevation and partially in section, of one of the gibs shown in FIG. 1;

FIG. 3 is a bottom plan view of the gib shown in FIG. 2, and

FIG. 4 is an end elevational view of the gib shown in FIG. 2.

DESCRIPTION OF THE EMBODIMENT SHOWN HEREIN

A gib 1, embodying the principles of the present invention, is shown in the drawings to illustrate the presently preferred embodiment of the present invention.

The gib 1 embodies, in general, a main body portion, in the form of a cylinder block 2, having a piston 3 slidably mounted therein, and with a thrust member 4 in the form of a backing block 5 and a wear plate 6 secured to the piston 3 in such a manner that the thrust member 4 may tilt relative to the piston 3 and the cylinder block 2, as will be discussed in greater detail presently.

The cylinder block 2 has a cylinder 7 extending therethrough. The cylinder 7 has a large end portion 8 opening outwardly through one side 9 of the block 2, and a smaller end portion 10 extending from the inner end 12 of the end portion 8 and opening outwardly through the side 11 of the block 2 remote from the side 9.

The piston 3 embodies a large end portion 13, which is mounted in the end portion 8 of the cylinder 7, and a small end portion 14 which is mounted in and extends outwardly from the small end portion 10 of the cylinder 7. The small end portion 14 of the piston 3 embodies an inner end portion 15 which is slidably mounted in the small end portion 10 of the cylinder 7, and an outer end portion 16 which projects outwardly from the cylinder block 2 and is externally threaded to receive a nut 17 thereon for a purpose which will be discussed in greater detail presently.

The end of the large end portion 13 of the piston 3, which is remote from the small end portion 14 thereof, has a recess 18 formed therein, the recess 18 having a radially inwardly projecting shoulder 19 therein. A thrust bearing 20, which is of the self-aligning type and, preferably, is of the type commonly known in the art as a spherical bearing, is mounted in the recess 18 in abutting engagement with the shoulder 19. The thrust member 4 has a hub 21 on one side thereof, which, in the assembled gib 1, is disposed within the thrust bearing 20 in engagement with the inner portion 22 thereof. The outer portion 23 of the thrust bearing 20 is disposed in engagement with the shoulder 19 and the interior of the recess 18.

The backing block 5 of the thrust member 4 has a counterbored opening 24 extending therethrough in axial alignment with the hub 21, the counter bore 25 of the opening 24 opening outwardly through the face 26 of the backing block 5 disposed on the opposite side thereof from the hub 21.

The large end portion 13 of the piston 3 has an opening 27 formed therein which opens outwardly into the recess 18 in axial alignment therewith, the opening 27 being disposed in such position that, when the thrust member 4 is disposed in operative position on the piston 3 the openings 24 and 27 are axially aligned. The opening 27 has an outer end portion 28, which is smooth walled and preferably is of the same diameter as the opening 24 in the thrust member 4, and an inner end portion 29 which is internally threaded and terminates in inwardly spaced relation to the small end portion 14 of the piston 3.

In the assembled gib 1, the thrust member 4 is releasably secured by a bolt 30 to the end portion 13 of the piston 3 between two ears 2a and 2b on the cylinder block 2. The bolt 30 has an enlarged head 31 at the one end thereof and a threaded end portion 32 at the other end thereof, the threaded end portion 32 being threadedly engaged in the threaded end portion 29 of the opening 27 in the piston 3, and the head 31 being disposed in the counter bore 25 of the opening 24 in the thrust member 4. The end portion 28 of the opening 27 and the portion of the opening 24 extending from the counter bore 25 are of sufficiently large diameter that the bolt 30 in the gib 1 is disposed therein with a loose fit, for a purpose which will be discussed in greater detail presently.

Preferably, a resilient gasket 33 is mounted in the counter bore 25 of the opening 24 in position to be engaged by the inner face of the head 31 of the bolt 30 when the bolt 30 is disposed in operative position in the gib 1, and the bolt 30 is a shoulder-bolt having a shoulder 34 engaged with the inner end of the end portion 28 of the opening 27 when the bolt 30 is in assembled position in the piston 3. A lock pin 35 extends through the head 31 of the bolt 30, and through an aligned opening 36 in the backing block 5, FIG. 4, to hold the bolt 30 in assembled position in the gib 1. Suitable plugs such as the plugs 37 and 38, FIG. 4, may be mounted in the respective ends of the opening 36 to hold the pin 35 in position in the bolt 30.

In the assembled gib 1, the wear plate 6 is mounted on the side 26 of the backing block 5 in covering relation to the opening 24. Preferably, the wear plate 6 is removably mounted on the backing block 5 in this position by suitable means such as bolts or screws 39.

An inlet port 40 is formed in one side 41 of the cylinder block 2, and an outlet port or drain port 42 is formed in the side 43 of the cylinder block 2 remote from the side 41. The inlet port 40 extends through the cylinder block 2 into communication with the large portion 8 of the cylinder 7 adjacent to the inner end wall 12 thereof, FIG. 2. As will be discussed in greater detail presently, in the operation of the gib 1, suitable working fluid, such as, for example, hydraulic fluid, may be fed through the inlet port 40 into the cylinder 7 between the wall 12 and the adjacent end of the large portion 13 of the piston 3 to thereby urge the piston 3 away from the wall 12, or to the right as viewed in FIG. 2.

The large portion 13 of the piston 3 has two hydraulic seals in the form of sealing rings 44 and 45 mounted in outwardly opening annular grooves 46 and 47 disposed at respective ends of the periphery of the large portion 13 thereof for preventing the passage of working fluid outwardly past the large portion 13 of the piston 3. Similarly, the end portion 15 of the small portion 14 of the piston 3 has a hydraulic seal in the form of a sealing ring 48 disposed in an annular, peripheral groove 49 for preventing the leakage of hydraulic fluid outwardly past the small portion 14 of the piston 3.

The outer peripheral surface of the large portion 13 of the piston 3 has a circumferentially extending recess 50 formed therein, the recess 50 being disposed between the grooves 46 and 47 and terminating in inwardly spaced relation thereto to thereby afford an annular chamber 51 between the large portion 13 of the piston 3 and the adjacent side wall portion of the cylinder 7. The outlet port or drain port 42 is so disposed in the cylinder block 2 that it is in communication with the chamber 51 in all operative positions of the piston 3 so that in the event of leakage of working fluid past the ring 44, such working fluid may be drained from the cylinder block 2.

In operation of the gib 1, it may be mounted in operative position on a suitable member, such as, for example, a slide 52 of a compression molding machine 53, FIG. 1, by means of bolts, such as bolts 54 and 55 extending through the cylinder block 2 on opposite sides of the cylinder 7 in such position that the wear plate 6 of the thrust member 4 is disposed in abutting engagement with the supporting member along which the gib 1 is to slide, such as, for example, a respective one of the stationary, upright supporting members 56 shown somewhat diagrammatically in FIG. 1. In FIG. 1, four such gibs 1 are shown mounted on the front face 57 of the slide 52, with two of the gibs 1 disposed at the upper and lower edge portions of the left side of the slide 52, as viewed in FIG. 1, in such position that the thrust members 4 thereof are disposed in operative engagement with respective, adjacent stationary supporting members 56, and with the other two gibs 1 disposed at the upper and lower edge portions of the right side of the slide 52, as viewed in FIG. 1, in such position that the thrust members 4 thereof are disposed in operative engagement with respective stationary supporting members 56 adjacent thereto.

As will be appreciated by those skilled in the art, the four gibs 1 are shown in FIG. 1 merely to illustrate the manner in which such gibs may be mounted on a member, such as the slide 52, and additional gibs, not shown, normally would be mounted on such a slide 52 in a compression molding machine, or the like, such as, for example, on the rear face thereof and on the two oppositely disposed side faces thereof, with each of such gibs being disposed in operative engagement with suitable, respective supporting members, not shown, such as, for example, supporting members of the type of the supporting members 56.

In the assembling of the gib 1, the nut 17 is adjusted to such position on the end portion 16 of the small portion 14 of the piston 3 that it will abuttingly engage the side 11 of the cylinder block 2 when the piston 3 is disposed in the position furthest to the right, as viewed in FIG. 2, that it is desired for it to occupy during operation of the gib 1, this position being hereinafter referred to as its outermost position. This outermost position of the piston 3 is adjusted for the particular machine in which the gib 1 is to be installed, so as to dispose the wear plate 6 on the thrust member 4 in proper frictional engagement with the respective adjacent supporting member 56 when the piston 3 is disposed in its aforementioned outermost position in the machine. Preferably, the nut 17 is of the lock nut type, embodying a flange 58 thereon which may be displaced longitudinally of the piston 3 by tightening a bolt 59 to thereby hold the nut 17 in adjusted position on the piston 3.

After the gib 1 has been mounted in such operative position in a machine, such as the machine 53, with the nut 17 disposed in properly adjusted position, working fluid, such as the aforementioned hydraulic fluid, may be fed from a suitable source of supply, such as a hydraulic pump, not shown, on the machine 53 through a suitable pipe or tube 60, FIG. 2 into the inlet port 40 from which it passes into the cylinder 7 between the large portion 13 of the piston 3 and the adjacent wall 12 of the cylinder 7 to thereby hold the piston 3 in its aforementioned outermost position during normal operation of the machine 53. For this purpose, the pressure of the working fluid in the cylinder 7 may be any desired suitable pressure, such as, for example, three thousand pounds per square inch, effective to hold the piston 3 in its outermost position with the desired force. This force is the maximum outward force that is to be allowed to be exerted by the gib 1 against the stationary supporting member 56 with which it is engaged during normal operation of the machine in which it is used. If, because of eccentric loading on the slide 52, or for other reasons in the operation of the machine 53, this maximum force is exceeded, the piston 3 is moved thereby to the left, as viewed in FIG. 2, against the urging of the working fluid to thereby relieve the pressure against the supporting member 56 with which it is engaged. Normally, such movement is a small fraction of an inch.

In addition to limiting the outer force on the respective supporting members 56 with which the gibs 1 are engaged, the present invention also affords a gib which has flexibility, permitting tilting of the slide, such as the slide 52, because of eccentric loading, or the like, without creating an excessive turning moment. It will be remembered that the end portion 28 of the opening 27 in the piston 3 and the main body portion of the opening 24 in the thrust member 4 are disposed around the shank of the bolt 30 with a loose fit, with the inner face of the head 31 of the bolt 30 engaging a resilient gasket 33. With this construction, and with the thrust member 4 seated on the self-aligning thrust bearing 20, the trust member 4 is free to turn left and right, as viewed in FIG. 2, relative to the cylinder block 2. Although such turning of the thrust member 4 is limited, it is of sufficient magnitude that, in normal operation of a machine, such as the machine 53, it is sufficient to relieve the strain which would otherwise be placed on a gib, and on the supporting frame of the machine due to the normally experienced eccentric loading of the machine as to prevent failure of the gib or other parts of the machine. This, in combination with the yieldable mounting of the thrust member 4 relative to the cylinder block 2, by reason of the reciprocability of the piston 3, affords effective protection against overloading of a machine 53 by reason of eccentric loading of the slide 52.

Preferably, the gib 1 also includes a limit switch, such as the normally closed switch 61, FIG. 2, which is actuatable by the piston 3 upon excessive movement thereof to the left as viewed in FIG. 2, and which may be connected to the main electrical control of a machine, such as the machine 53, to thereby completely shut down the machine upon actuation of the switch 61 to open position. For this purpose, the switch 61 may embody connectors, such as wires 62 connected into the proper controlling circuit for the machine on which the gib 1 is mounted, such as, for example, into the main circuit thereof. The switch 61 is mounted on a bracket 63, which is mounted on the side 41 of the cylinder block 2 by suitable means such as bolts 64, the bracket 63 being disposed in position effective to support the switch 61 in alignment with the outer end of the small end portion 14 of the piston 3, with the actuating member 65 of the switch 61 disposed in facing relation to the piston 3.

A bolt 66 is threaded into a tapped opening 67 formed in the outer end portion of the small end portion 14 of the piston 3 in axial alignment with the actuating member 65 of the switch 61. The bolt 66 may be adjusted in the opening 67 to the proper spacing relative to the switch 61, affording the desired permissible travel of the piston 3 to the left, as viewed in FIG. 2, prior to actuation of the switch 61, and may be held in such adjusted position by suitable means, such as, for example, a lock nut 68.

With this construction, it will be seen that the gib 1 will accommodate a predetermined amount of tilting of a slide, such as the slide 52, without substantially increasing the thrust of the gib 1 against its supporting member, such as the supporting member 56; if because of eccentric loading of the slide 52, or the like, the thrust of the gib 1 against the supporting member 56 exceeds the force afforded by the hydraulic fluid pressure between the piston 3 and the wall 12 of the cylinder 7, the piston 3 is caused to move to the left to thereby prevent the force applied to the supporting member 56 from exceeding the predetermined, desired limits of this force, as determined by the hydraulic pressure applied to the large end 8 of the piston 3; and if the travel to the left, as viewed in FIG. 2, of the piston 3, because of above-normal thrust being applied through the gib 1, exceeds a predetermined amount, the abutment in the form of the bolt 66 on the piston 3 will engage the actuating member 65 of the switch 61 to thereby open the switch 61 and shut down the machine 53.

From the foregoing, it will be seen that the present invention affords a novel hydraulic gib.

Also, it will be seen that the present invention affords a novel gib which has flexibility permitting a predetermined amount of tilting of a slide, or the like, without substantially increasing the normal bending or turning moment on the gib.

In addition, it will be seen that the present invention affords a novel gib which is effective in a novel and expeditious manner to limit the thrust applied therethrough to the supporting framework of a machine in which it is embodied.

Further, it will be seen that the present invention affords a novel gib which is effective to completely close down a machine in which the operation is such that the outward thrust through the gib exceeds a predetermined amount.

Also, it will be seen that the present invention affords a novel gib which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A gib for use on molding machines, and the like, which embody stationary supporting means and a slide supported by and movable along said supporting means, said gib comprising
   a. a main body portion having a cylinder extending therethrough,
   b. means for mounting said body portion in operative position on such a slide,
   c. a piston movably mounted in said cylinder for reciprocation therethrough into and out of one position,
   d. means on said piston and engageable with said body portion in position to stop said piston in said one position during movement of said piston in one direction through said cylinder,
   e. means on said piston for engaging such a supporting means when said body portion is disposed in said operative position on such a slide,
   f. means for feeding working fluid into said cylinder in position to urge said piston to move in said one direction,
   g. a spherical bearing disposed in operative position between said piston and said means for engaging a supporting means, and
   h. means holding said piston and said means for engaging a supporting means in engagement with opposite sides of said bearing for tilting movement relative to each other transversely to the longitudinal axis of said cylinder,
   i. said means for stopping said piston comprising a nut adjustably mounted on said piston in position to engage said body portion.

2. A gib for use on molding machines, and the like, which embody stationary supporting means and a slide supported by and movable along said supporting means, said gib comprising
   a. a main body portion having a cylinder extending therethrough,
   b. means for mounting said body portion in operative position on such a slide,
   c. a piston movably mounted in said cylinder for reciprocation therethrough into and out of one position,
   d. means on said piston and engageable with said body portion in position to stop said piston in said one position during movement of said piston in one direction through said cylinder,
   e. means on said piston for engaging such a supporting means when said body portion is disposed in said operative position on such a slide,
   f. means for feeding working fluid into said cylinder in position to urge said piston to move in said one direction,
   g. a switch mounted on said body portion for controlling the operation of such a machine, and
   h. means on said piston in position to operatively engage said switch to open the latter upon movement of said piston beyond a predetermined position in the direction opposite to said one direction.

3. A gib for supporting a slide from a support in a compression molding machine, and comprising
   a. a body portion having a cylinder extending therethrough,
   b. said cylinder having
      1. a large end portion and
      2. a small end portion,
   c. a piston having
      1. a large end portion mounted in said large end portion of said cylinder, and
      2. a small end portion mounted in said small end portion of said cylinder,
   d. means for mounting said body portion in operative position on such a slide,
   e. a thrust member mounted on the side of said large end portion of said piston remote from said small end portion thereof for engaging such a support when said body portion is disposed in said operative position on such a slide,
   f. means for feeding working fluid into said cylinder in position to urge said piston to move through said cylinder in a direction away from said small end portion of said cylinder, and
   g. means on said piston for limiting movement of said piston in said direction.

4. A gib as defined in claim 3, and in which
   a. said means for limiting movement comprises a member adjustably mounted on said piston in position to engage said body portion when said piston is disposed in a predetermined position in said cylinder.

5. A gib as defined in claim 3, and in which
   a. said small end portion of said piston includes an outer end portion which projects outwardly of said body portion, and
   b. said means for limiting movement comprises a nut threadedly secured to said outer end portion in position to abuttingly engage said body portion.

6. A gib as defined in claim 3, and which includes
   a. a self-aligning thrust bearing disposed in operative position between said piston and said thrust member, and
   b. means releasably securing said piston and said thrust member in engagement with respective opposite sides of said bearing for tilting movement relative to each other.

7. A gib as defined in claim 6, and in which
   a. said means releasably securing said piston and thrust member comprises a shoulder bolt extending through said thrust member and threaded into and seated in said piston.

8. A gib as defined in claim 6, and in which
   a. said body portion has two outwardly projecting ears disposed in substantially parallel spaced relation to each other, and
   b. said thrust member is disposed between said ears.

9. In a machine embodying supporting means and a slide supported by and movable along said supporting means,
   a. a gib, and
   b. means mounting said gib in operative position on said slide,
   c. said gib comprising
      1. a main body portion mounted in operative position on said slide,
      2. a piston movably mounted in said body portion for reciprocation therethrough in one direction toward one position and in another direction toward another position
      3. means mounted on one end of said piston in position to operatively engage said supporting means when said piston is disposed in said one position, and
      4. means limiting movement of said piston in said one direction relative to said body portion.

10. In a machine embodying stationary supporting means and a slide supported by and movable along said supporting means,
    a. a gib, and
    b. mounting means,
    c. said gib comprising
       1. a main body portion
          a'. secured by said mounting means to said slide, and
          b'. having a cylinder extending therethrough,
       2. a piston movably mounted in said cylinder for reciprocation therethrough into and out of one position,
       3. means on said piston and engageable with said body portion in position to stop said piston in said one position during movement of said piston in one direction through said cylinder,
       4. means on said piston in position to engage said supporting means when said piston is disposed in said one position, and
       5. means for feeding working fluid into said cylinder in position to urge said piston toward said one position.

11. The combination defined in claim 10, and in which
    a. said means for engaging said supporting means is movably mounted on said piston and tiltable relative thereto.

* * * * *